3,312,996
FISH SCALING TOOL
George Gordon, 11726 100th Ave., Edmonton,
Alberta, Canada
Filed Apr. 19, 1965, Ser. No. 449,111
4 Claims. (Cl. 17—7)

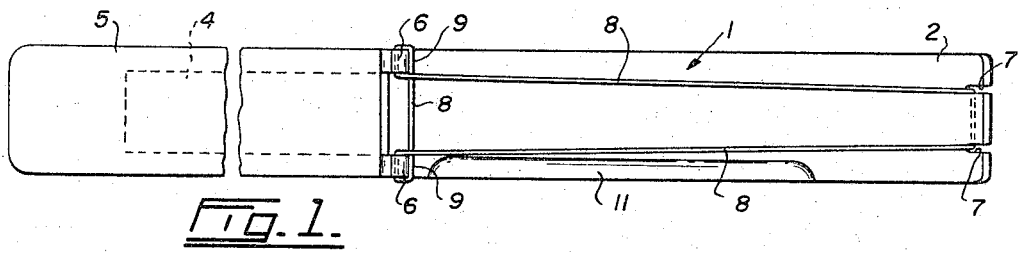
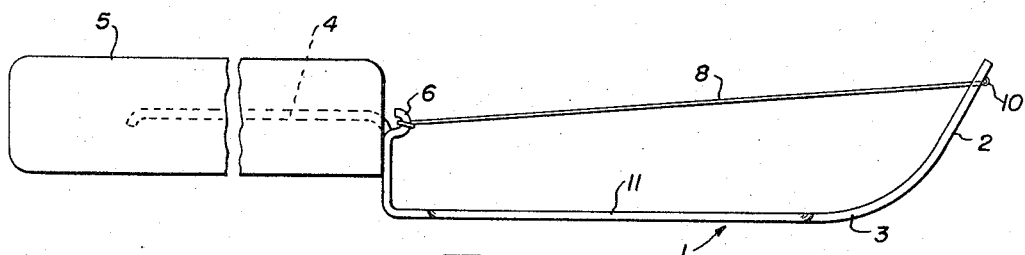
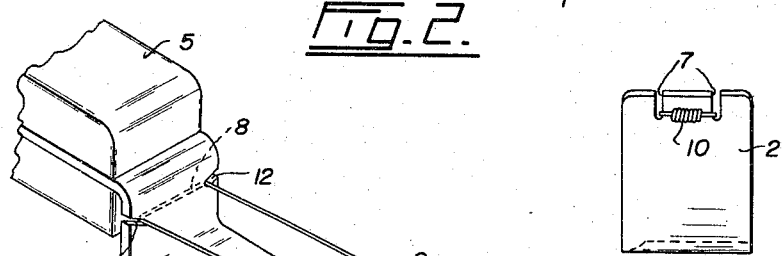
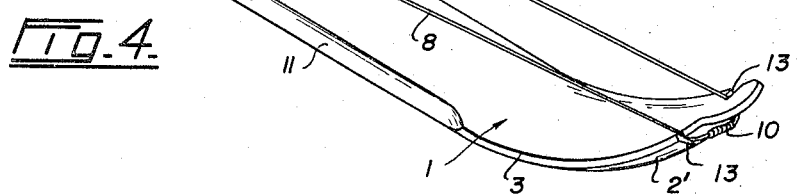
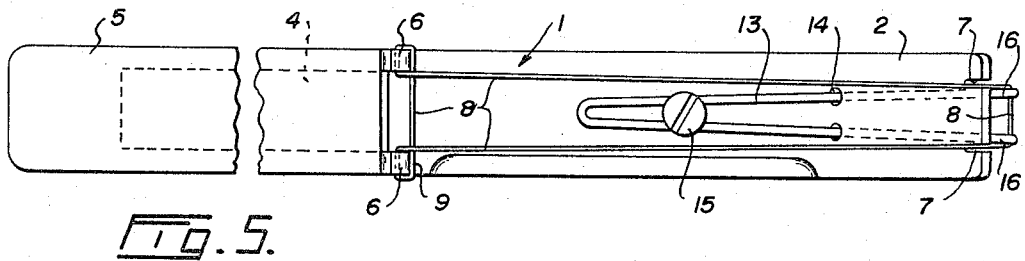
GEORGE GORDON
INVENTOR

This invention relates generally to cutting devices and particularly to a tool for scaling fish.

In the hands of someone other than an expert, the removal of fish scales can be a tedious and time consuming undertaking.

Usually it is accomplished by using a knife edge or scraper which is either drawn or pushed along the side of the fish to rip off the scales.

While such procedure may in some instances, be satisfactory, it usually results in bruising or cutting the skin and flesh of the fish and, unless considerable care is taken not all of the fish scales are removed.

I have found that this operation may best be performed by using a cutting wire that will conform to the contour of the fish and that may be drawn along the side of the fish to pass under the scales and to remove the scales neatly from the fish body.

In essence, my invention comprises a bowed elastic back member with a handle secured at one end and with a pair of spaced, parallel, substantially horizontal cutting wires stretched across the back member and maintained in tension by the elasticity of the back member.

In drawings illustrating a preferred embodiment:

FIGURE 1 is a top plan view of a preferred tool embodying my invention.

FIGURE 2 is a side elevation of the tool of FIGURE 1.

FIGURE 3 is a front view of the tool of FIGURES 1 and 2.

FIGURE 4 is a broken away perspective view illustrating an alternate embodiment.

FIGURE 5 is a perspective view illustrating a further embodiment.

With reference now to the drawings, my device comprises the back member illustrated generally at 1 which is curved at its forward end 2 as indicated at 3 and is bent at its rearward end to provide the tang 4 on which is secured the handle 5. It should also be noted that the rear end of the back member 1 is formed with a pair of hooks 6 for attachment of the descaling wire.

At its forward end 2 the member is slotted as indicated at 7 and the loop wire member 8 is then secured by wrapping around the hooks 6 as indicated at 9, stretching the wire across the back portion 1 where it is lodged in the slots 7 and twisted and soldered or otherwise secured as indicated at 10.

In actual practice, the wire 8 would be precut to length with its ends secured and the wire then would be stretched across the back member by firstly wrapping the wire around the hooks 6 and then bending the front portion 2 of the back member to allow the closed end of the wire to be slipped in the slots 7. Thereafter when the forward end is released, the elasticity of the back member 1 would draw the wires of said loop member 8 taut.

To provide a knife cutting surface in the tool, one of the edges 11 is ground to a sharp edge as indicated.

In the alternate embodiment illustrated in FIGURE 4 in the drawings, the rear portion of the back member is slotted angularly as indicated at 12 while the front portion 2′ is curved laterally and slotted as indicated at 13. With this construction, the loop wire 8 is slipped into position between the end of the handle 5 and the back member to lodge in the slots 13 and thereafter as the forward end 2 of the back member is bowed the ends of the wire may be slipped into place in the slot 13 and, when released, the elasticity of the back member will maintain the wire in a taut position.

In the embodiment illustrated in FIGURE 5 in the drawings the back member 1 is in substantially the form illustrated in FIGURES 1, 2 and 3 in the drawings but in this case is provided with a U-shaped wire tightener 13 which is passed through openings 14 to project beneath the end 2 of the body member. The member 13 is secured for adjustment by the tightening screw 15 which engages in the back member 1. The forward ends 16 of the wire tightener 13 then engage with the end of the end of the wire member 8 to maintain it in a taut condition when stretched over the back member.

In operation, the cutting wire 8 is stretched over the back member 1 and tensioned as described. When a fish is to be scaled, it is simply necessary to place the cutting wires on the body of the fish and to press down on the handle so that the wires will be formed into contact with the fish body. Thereafter the knife is pushed or pulled along the fish body to push or pull the cutting wires under the fish scales. As the tool is moved along the body of the fish the scales will be lifted quickly and easily without damage to the skin or flesh of the fish.

What I claim as my invention is:

1. A fish scaling tool comprising a bowed, elastic back member having at one end thereof an angularly disposed extension, a handle secured to said extension extending in a plane generally parallel with the longitudinal plane of said back member, a wire loop member extending from one end of said back member to the other to provide a pair of spaced, parallel descaling wires, the ends of said back member being provided with means for engaging said wire loop member to maintain said spaced parallel wires under tension whereby said wires may be moved under the scales of a fish to remove them from the fish.

2. A fish scaling tool as set forth in claim 1, wherein said engaging means includes a pair of slots in one end of said back member for engagement by said loop member.

3. A fish scaling tool as set forth in claim 2, wherein said engaging means includes a pair of hooks in the other end of said back member for engagement by said loop member.

4. A fish scaling tool as set forth in claim 1, wherein said engaging means includes a pair of hook members on one end of said back member and an adjustable tensioning means on the other end of said back member whereby the tension on the parallel wires of the loop member may be adjusted to maintain said loop member in a taut condition.

References Cited by the Examiner

UNITED STATES PATENTS

| | | | |
|---|---|---|---|
| 1,796,212 | 3/1931 | Nadeo | 31—22 |
| 2,159,299 | 5/1939 | Tanzmann. | |
| 2,333,855 | 11/1943 | Gascoigne | 146—213 |

FOREIGN PATENTS

| | | |
|---|---|---|
| 741,061 | 12/1932 | France. |
| 573,227 | 3/1933 | Germany. |

LUCIE H. LAUDENSLAGER, *Primary Examiner.*

SAMUEL KOREN, *Examiner.*